(12) United States Patent
Ho

(10) Patent No.: US 7,191,675 B2
(45) Date of Patent: Mar. 20, 2007

(54) TRANSMISSION GEARBOX FOR MOTOR VEHICLE

(75) Inventor: Chao-Chang Ho, Fongshan (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 238 days.

(21) Appl. No.: 10/967,203

(22) Filed: Oct. 19, 2004

(65) Prior Publication Data

US 2006/0081080 A1  Apr. 20, 2006

(51) Int. Cl.
*F16H 3/08* (2006.01)
(52) U.S. Cl. .................................. 74/329; 74/606 R
(58) Field of Classification Search ............... 74/12, 74/331, 333, 335, 337.5, 665 GE
See application file for complete search history.

(56) References Cited

U.S. PATENT DOCUMENTS 4,574,652 A * 3/1986 Shichinohe et al. ..... 74/473.21
4,989,468 A * 2/1991 Kumazawa .................... 74/12

* cited by examiner

*Primary Examiner*—Roger Pang
*Assistant Examiner*—Derek D. Knight
(74) *Attorney, Agent, or Firm*—Bacon & Thomas, PLLC

(57) ABSTRACT

The present invention is to provide a transmission gearbox comprising a gearshift shifting mechanism formed by a gearshift hub, a first push rod, a second push rod, a first sliding block and a second sliding block to transfer engine driving force from a driven shaft through a linking shaft and a main shaft to an output shaft, wherein the first sliding block is slidably mounted on the main shaft; the main shaft has mounted thereon a forward gear, a low-range gear, and a transmission gear; the second sliding block is slidably mounted on the linking shaft; the linking shaft has mounted thereon a back gear, a low-range gear, a forward gear, and a drive bevel gear, the back gear being mounted on the linking shaft at one side relative to the second sliding block, the low-range gear, forward gear and drive bevel gear at the linking shaft being disposed at one side relative to the second sliding block opposite to the back gear.

3 Claims, 6 Drawing Sheets

US 7,191,675 B2

TRANSMISSION GEARBOX FOR MOTOR VEHICLE

BACKGROUND OF THE INVENTION

1. Field of the Invention

The present invention relates to a transmission gearbox, and more particularly to an improved structure of transmission gearbox for use in a motor vehicle as to eliminate the problem of difficulty in adjusting the presence of a backlash of the transmission bevel gear in the prior art and achieve the purposes of easy maintenance and assembly and reducing the number of parts within the gearbox.

2. Description of Related Art

FIG. 1 shows a transmission gearbox for use in a motor vehicle according to the prior art. According to this design, the transmission gearbox 10 comprises a driven shaft 11 adapted to receive the driving force of the engine through a belt transmission mechanism (not shown), a transmission gear 111, and a linking shaft 12 adjacent to the driven shaft 11. The linking shaft 12 has mounted thereon in proper order a first gear 121, a back sliding block 122, a back bevel gear 124, a second gear 125, a third gear 126, a forward bevel gear 127, and a fourth gear 128. The first gear 121 is meshed with the transmission gear 111. The back sliding block 122 and the back bevel gear 124 each have a coupling hole 123 or 123'. The back sliding block 122 has a toothed portion (not shown) meshed with the linking shaft 12 such that the back bevel gear 124 and the forward bevel gear 127 and the fourth gear 128 run idle during rotation of the linking shaft 12.

Further, a main shaft 13 is provided at the other side of the linking shaft 12. The main shaft 13 has mounted thereon in proper order a low-range gear 131, a corresponding sliding block 132, a forward gear 133, and a transmission gear 134. The low-range gear 131, the sliding block 132 and the forward gear 133 each have a coupling hole 123 or 123'. The sliding block 132 has a toothed portion (not shown) meshed with the main shaft 13 such that the second gear 125 at the linking shaft 12 meshes with the forward gear 133 at the main shaft for synchronous rotation and the low-range gear 131 and the forward gear 133 run idle on the main shaft 13 before connection of the sliding block 132 to the coupling hole 123 of the forward gear 133.

Further, a first push rod 141 and a second push rod 143 are respectively fastened to the coupling hole 123 of the back sliding block 122 and the coupling hole 123' of the sliding block 132. The first push rod 141 and the second push rod 143 are respectively mounted on a shaft 14, each having the other end terminating into a respective tip 142 or 144 that is respectively inserted into a respective sliding groove 151 or 152 at a gearshift hub 15 for moving a gearshift lever 16 into the desired gearshift position.

Further, the forward bevel gear 127 at the linking shaft 12 is meshed with a transmission bevel gear 21 at the output shaft 20.

When shifting the gearshift lever 16 to the back gearshift position, the drive gear 161 at the gearshift lever 16 moves a driven gear 153 at the gearshift hub 15. At this time, the first push rod 141 pushes the back sliding block 122 into the coupling hole 123' of the back bevel gear 124, for enabling the driving force to be transferred from the transmission gear 111 at the driven shaft 11 to the linking shaft 12. Because the back bevel gear 124 is sleeved onto the linking shaft 12. Rotating the linking shaft 12 does not cause the back bevel gear 124 to rotate. At this time, the back sliding block 122 drives the linking shaft 12 to rotate, and therefore the engine driving force is transferred through the back bevel gear 124 to the transmission bevel gear 21 and the output shaft 20 and then to the rear wheels of the motor vehicle for backward movement.

According to this design, the transmission bevel gear 21 at the output shaft 20 is adapted to mesh with the back bevel gear 124 and the forward bevel gear 127. During gear transmission between the transmission bevel gear 21 and the back bevel gear 124/forward bevel gear 127, a noise is produced due to the presence of a backlash. Further, the processing precision requirement of these bevel gears is critical. Loose engagement between the transmission bevel gear 21 and the back bevel gear 124/forward bevel gear 127 produces a high noise during transmission.

FIG. 2 shows another structure of transmission gearbox according to the prior art. According to this design, the transmission gearbox 30 comprises a gearbox body 31 and a gearbox cover 32. The gearbox body 31 and the gearbox cover 32 define a space for accommodating an output shaft set 33, which is comprised of an output shaft 34, a bearing 35, and a transmission bevel gear 36. A C-shaped clamp 37 is installed in the transmission gearbox to secure the bearing 35 to the inside of the transmission gearbox between the gearbox body 31 and the gearbox cover 32. The positioning precision of the C-shaped clamp 37 is also critical. If the C-shaped clamp 37 is not accurately installed in position between the gearbox body 31 and the gearbox cover 32, a big backlash will be produced at the transmission bevel gear 36, thereby resulting in a high noise during transmission operation of the transmission gearbox.

SUMMARY OF THE INVENTION

The present invention has been accomplished under the circumstances in view. It is therefore the main object of the present invention to provide a transmission gearbox, which eliminates the drawbacks of the aforesaid prior art designs. According to the present invention, the transmission gearbox comprises a gearshift hub, a first push rod, a second push rod, a first sliding block, a second sliding block, a driven shaft, a linking shaft, a main shaft, and an output shaft, the gearshift hub and the first push rod and the second push rod and the first sliding block and the second sliding block forming a gearshift shifting mechanism to transfer engine driving force from the driven shaft through the linking shaft and the main shaft to the output shaft, wherein: the first sliding block is slidably mounted on the main shaft; the main shaft has mounted thereon a forward gear, a low-range gear, and a transmission gear; the second sliding block is slidably mounted on the linking shaft; the linking shaft has mounted thereon a back gear, a low-range gear, a forward gear, and a drive bevel gear, the back gear being mounted on the linking shaft at one side relative to the second sliding block, the low-range gear, forward gear and drive bevel gear at the linking shaft being disposed at one side relative to the second sliding block opposite to the back gear. Further, the transmission gearbox comprises a gearbox body and gearbox cover covering the gearbox body. The gearbox cover defines therein a receiving chamber, which accommodates the output shaft, which has a driven bevel gear fixedly mounted thereon and meshed with the drive bevel gear. Further, the gearbox cover has a detachable lid for easy access to the drive bevel gear at the linking shaft. Further, the gearbox has a mounting hole disposed in communication with the receiving chamber and accommodating an actuation rod, which has a first end, a worm fixedly mounted on the first end and meshed with a toothed portion at one end of the linking shaft, and a second end connected to a mileage counter through a cable for driving the mileage counter to count upon rotary motion of the actuation rod with the linking shaft.

The invention achieves the following advantages:

1. The invention eliminates the noise problem due to the presence of a backlash between the transmission bevel gear and the back bevel gear/forward bevel gear as encountered in the prior art design.

2. By means of the detachable lid at the gearbox cover, a maintenance engineer is easily accessible to the drive bevel gear at the linking shaft.

3. The gearbox cover defines therein a receiving chamber for quick installation of the output shaft with a screw. Because the installation of the output shaft according to the present invention eliminates the use of a C-shaped clamp, the installation procedure of the output shaft is simple, saving much labor and installation time.

4. The gearbox has a mounting hole disposed in communication with the receiving chamber for accommodating an actuation rod for rotating a mileage counter cable to drive a mileage counter to start counting upon rotary motion of the linking shaft.

The above and other objects, features and advantages of the present invention will become apparent from the following detailed description taken in conjunction with the accompanying drawings.

DETAILED DESCRIPTION OF THE PREFERRED EMBODIMENT

Figure 1:
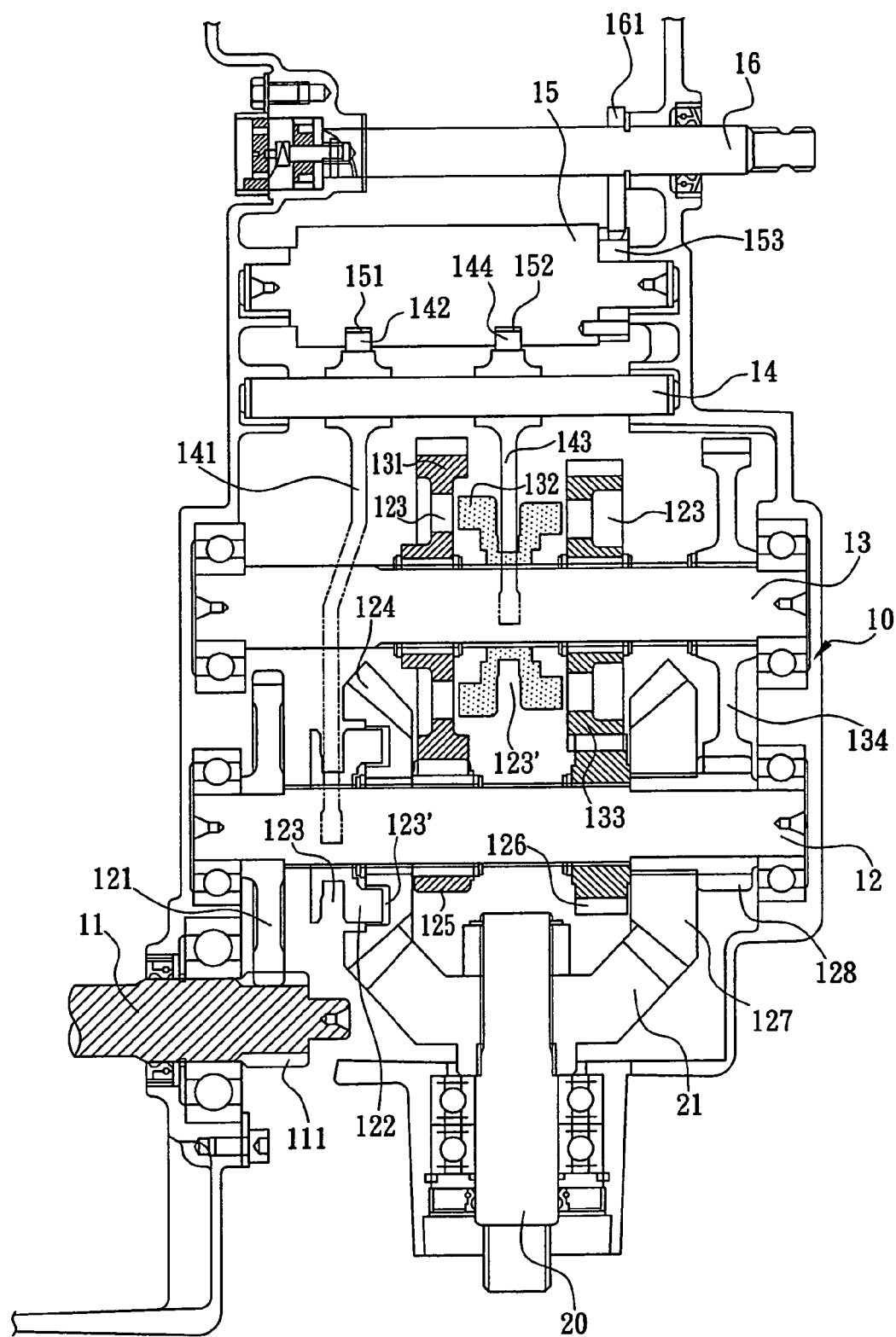
FIG. 1 is a schematic drawing of a transmission gearbox according to the prior art, showing the gearshift lever shifted to the back gearshift position.
Figure 2:
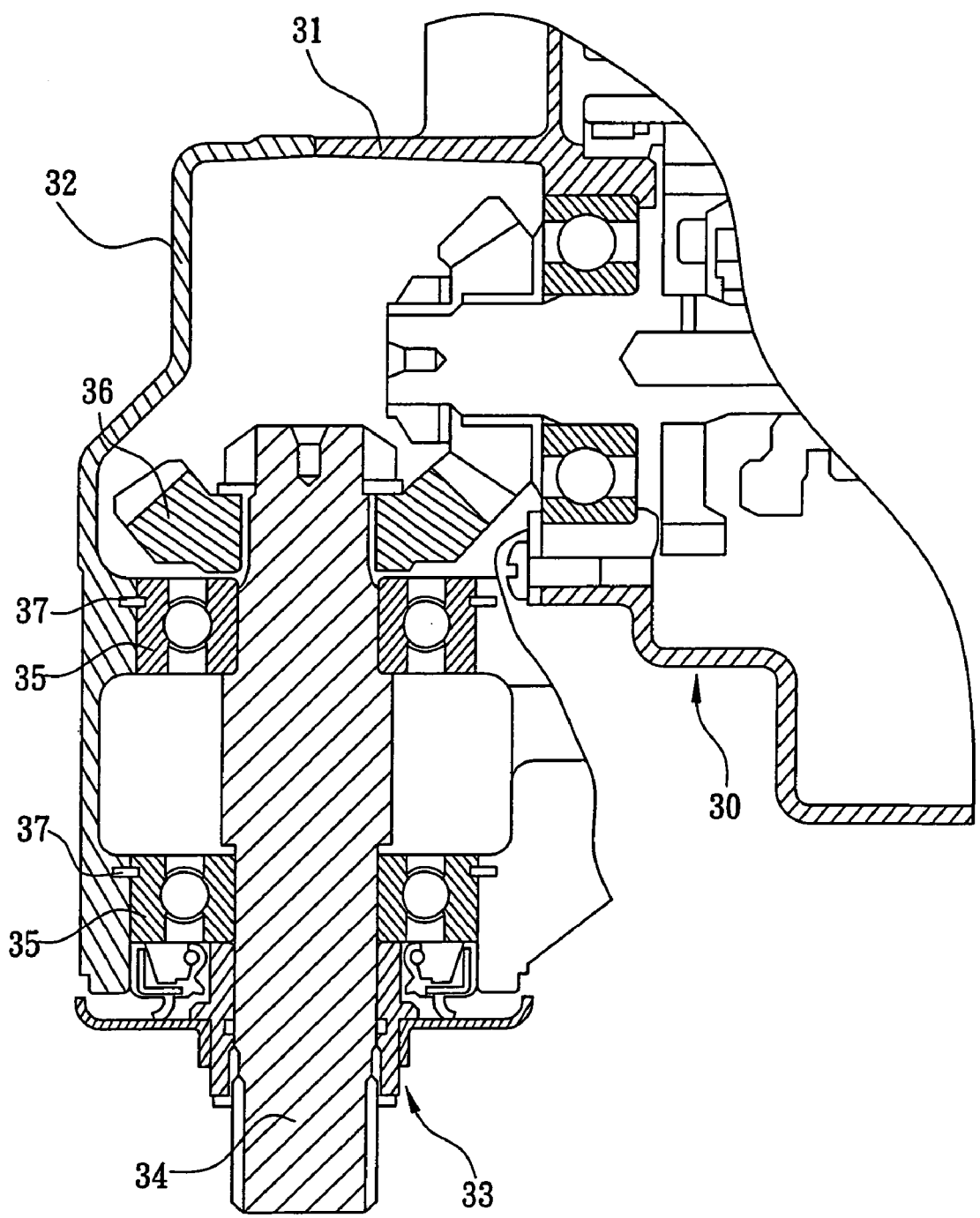
FIG. 2 is a schematic drawing of a part of another structure of transmission gearbox according to the prior art.
Figure 3:
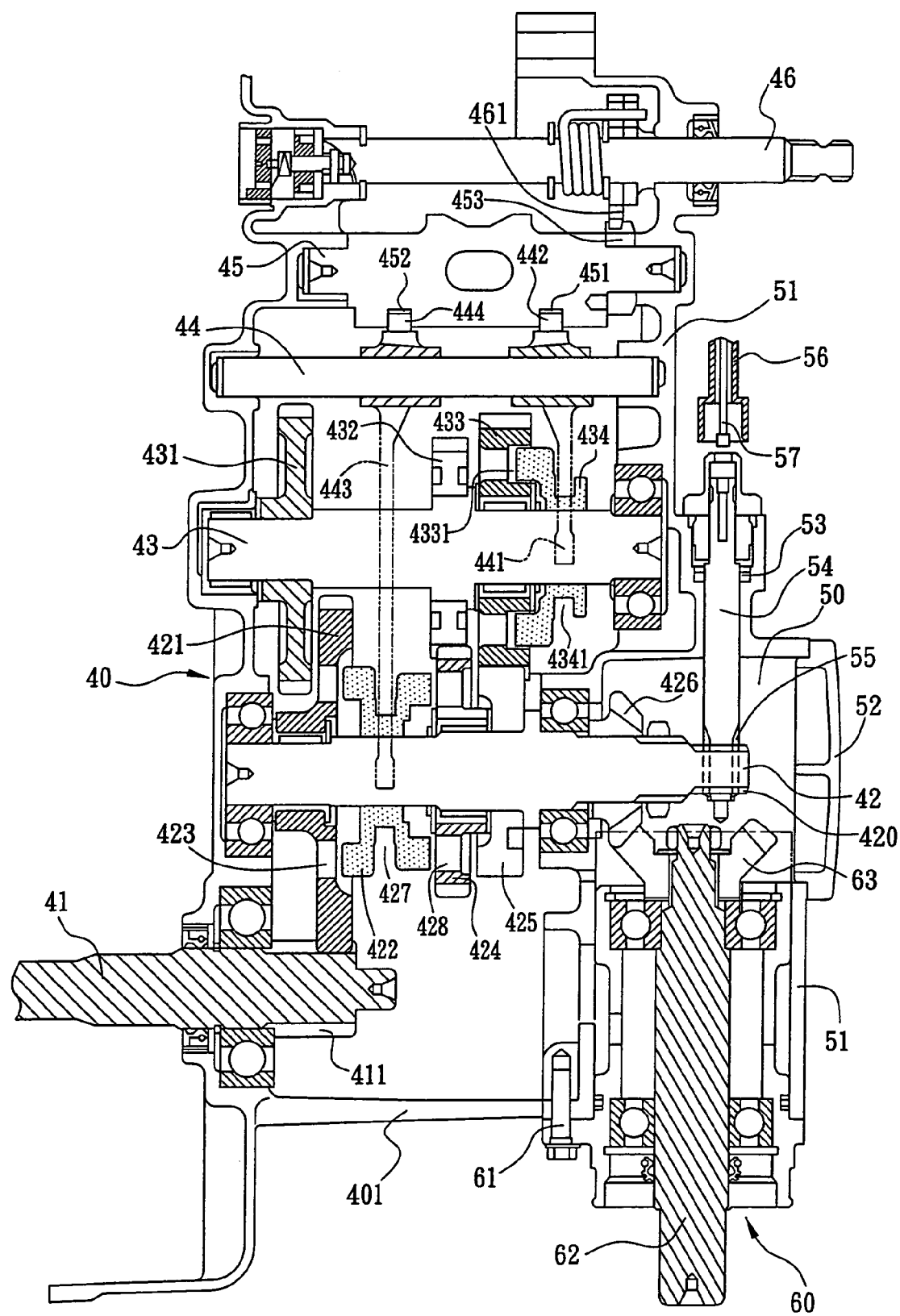
FIG. 3 is a schematic drawing of a transmission gearbox according to the present invention, showing the gearshift lever shifted to the forward gearshift position.

Referring to FIG. 3, a transmission gearbox 40 is shown comprising a box body 401 gearbox covered with a gearbox cover 51, a driven shaft 41 pivotally mounted in the box body 401 for receiving driving power from an engine (not shown) through a belt transmission mechanism (not shown), a transmission gear 411 formed integral with the periphery of the driven shaft 41, and a linking shaft 42 arranged in parallel to the driven shaft 41. The linking shaft 42 has mounted thereon in proper order a back gear 421, a second sliding block 422, a low-range gear 424, a forward gear 425, and a drive bevel gear 426. The back gear 421 is fixedly mounted on the linking shaft 42 and meshed with the transmission gear 411. The back gear 421, second sliding block 422 and the low-range gear 424 each have a coupling hole 423, 427, or 428. The second sliding block 422 has a toothed portion (not shown) meshed with a toothed portion (not shown) of the linking shaft 42. During rotation of the linking shaft 42, the back gear 421 and the low-range gear 424 run idle.

A main shaft 43 is mounted in the box body 401 and arranged in parallel to the linking shaft 42 at one side opposite to the driven shaft 41. The main shaft 43 has mounted thereon in proper order a transmission gear 431, a low-range gear 432, a forward gear 433, and a first sliding block 434. The transmission gear 431 is meshed with the transmission gear 411 at the driven shaft 41 (It is not visible from FIG. 3). The forward gear 433 and the first sliding block 434 each have a coupling hole 4331 or 4341. The first sliding block 434 has a toothed portion (not shown) meshed with a toothed portion (not shown) of the main shaft 43. The low-range gear 432 is meshed with the low-range gear 424 at the linking shaft 42. The forward gear 433 is meshed with the forward gear 425 at the linking shaft 42. During rotation of the main shaft 43, the forward gear 433 runs idle.

A first push rod 441 and a second push rod 443 are respectively fastened to the coupling hole 4341 of the first sliding block 434 and the coupling hole 427 of the second sliding block 422. The first push rod 441 and the second push rod 443 each have the other end terminating into a respective tip 442 or 444 that is respectively inserted into a respective sliding groove 451 or 452 at a gearshift hub 45 for moving a gearshift lever 46 into the desired gearshift position.

Figure 6:
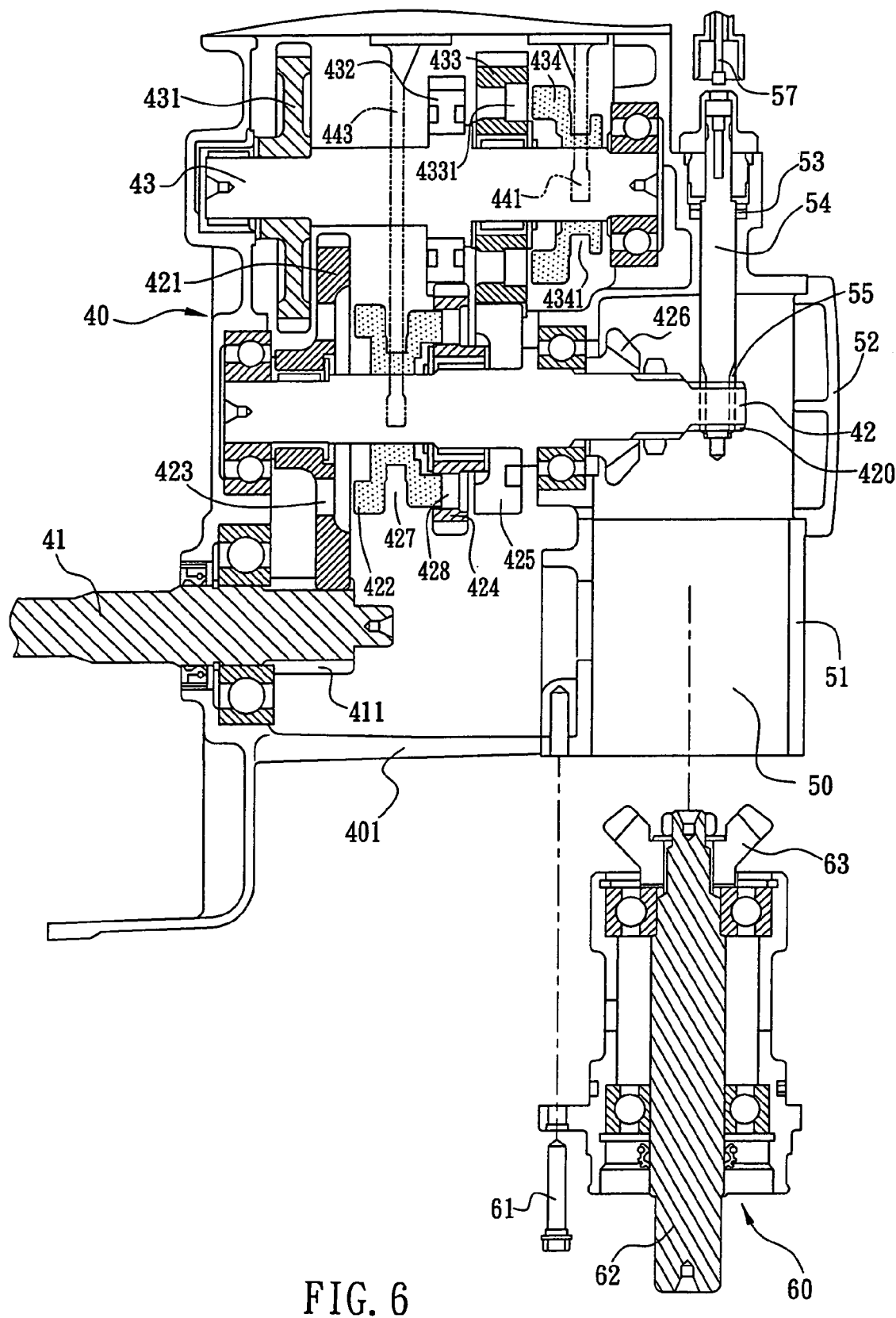
FIG. 6 is a schematic drawing of the present invention, showing the output shaft set separated from the transmission gearbox.

Referring to FIG. 6 and FIG. 3 again, the transmission gearbox 40 has a receiving chamber 50 around the drive bevel gear 426 at the linking shaft 42. The receiving chamber 50 is directly formed in the gearbox cover 51 for quick installation of an output shaft set 60. The output shaft set 60 is fastened to the gearbox cover 51 with a fastening member 61 (for example, screw). The output shaft 62 of the output shaft set 60 is mounted with a driven bevel gear 63, which is meshed with the drive bevel gear 426 at the linking shaft 42.

The gearbox cover 51 has a detachable lid 52 corresponding to the drive bevel gear 426 at the linking shaft 42. By means of the detachable arrangement of the detachable lid 52, the maintenance engineer is easily accessible to the drive bevel gear 426.

The receiving chamber 50 is in communication with a mounting hole 53, which accommodates an actuation rod 54. The actuation rod 54 has mounted on one end thereof a worm gear 55 meshed with a toothed portion 420 at one end of the linking shaft 42. Therefore, the linking shaft 42 can rotate the actuation rod 54. The actuation rod 54 has the other end connected to a mileage counter in an instrument board (not shown) through a cable 56. Therefore, during rotary motion of the actuation rod 54, the core 57 of the cable 56 is synchronously rotated to drive the mileage counter to count the speed and mileage of the motor vehicle.

Referring to FIG. 3 again, a drive gear 461 is mounted on the gearshift lever 46 and meshed with a driven gear 453 at the gearshift hub 45. When operating the gearshift lever 46 to move the gearshift hub 45 to the forward gearshift position, the first push rod 441 will move the first sliding block 434 into the coupling hole 4331 of the forward gear 433, for enabling the engine driving force to be transferred from the transmission gear 411 at the driven shaft 41 to the transmission gear 431 at the main shaft 43 to rotate the main shaft 43. At this time, the forward gear 433 will be changed from the idle-running status to the working status to rotate the forward gear 425, the linking shaft 42, the drive bevel gear 426, the driven bevel gear 63 and the output shaft 62, and to further rotate the rear wheels of the motor vehicle for forward movement (not shown).

Figure 4:
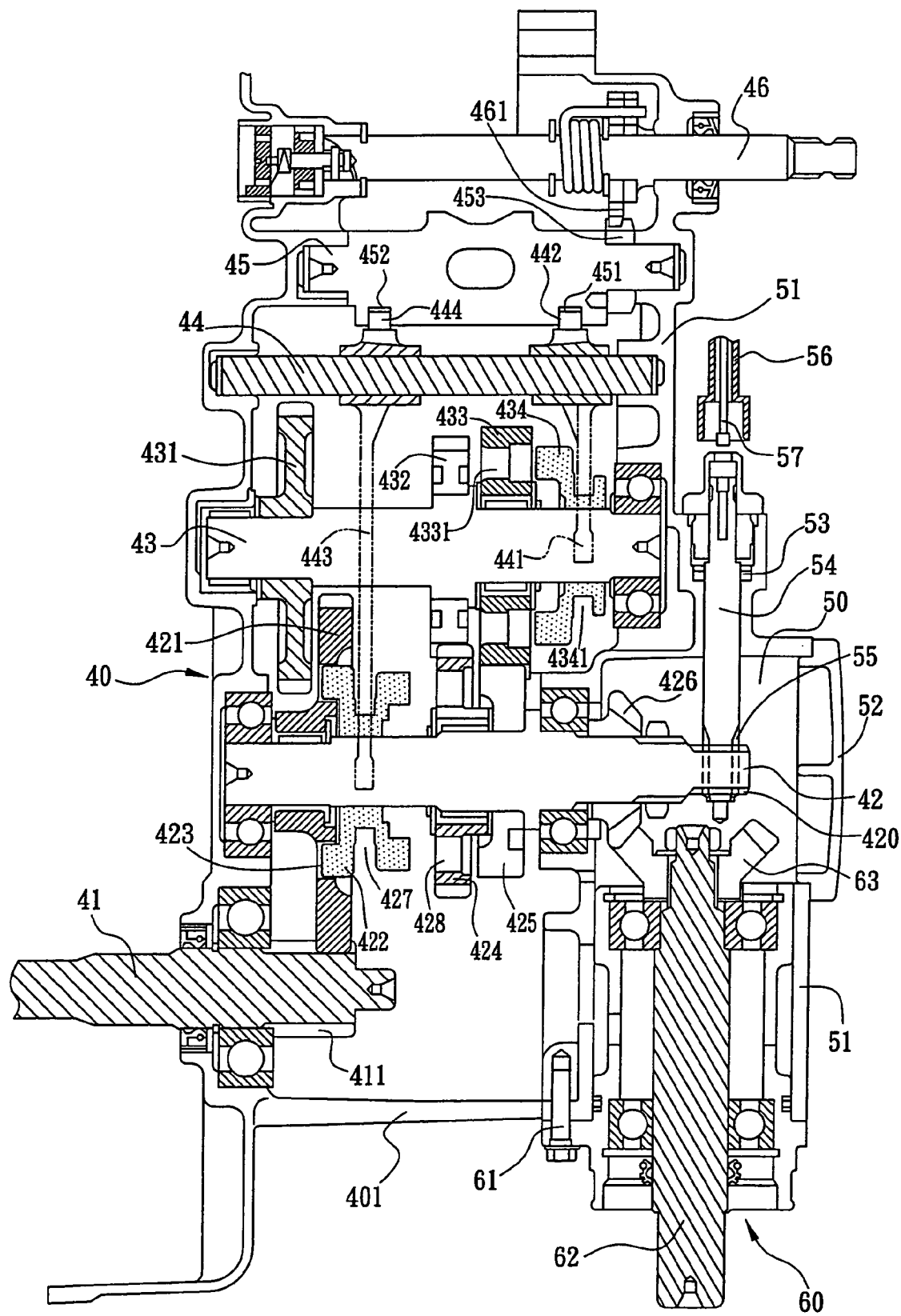
FIG. 4 is similar to FIG. 3 but showing the gearshift lever shifted to the back gearshift position.

Referring to FIG. 4, when operating the gearshift lever 46 to move the gearshift hub 45 to the backward gearshift position, the second push rod 443 will move the second sliding block 422 into the coupling hole 423 of the back gear 421, for enabling the engine driving force to be transferred from the transmission gear 411 at the driven shaft 41 to the linking shaft 42. At this time, the back gear 421 will be changed from the idle-running status to the working status to rotate the linking shaft 42, the drive bevel gear 426, the driven bevel gear 63 and the output shaft 62, and to further rotate the rear wheels of the motor vehicle for backward movement (not shown).

Figure 5:
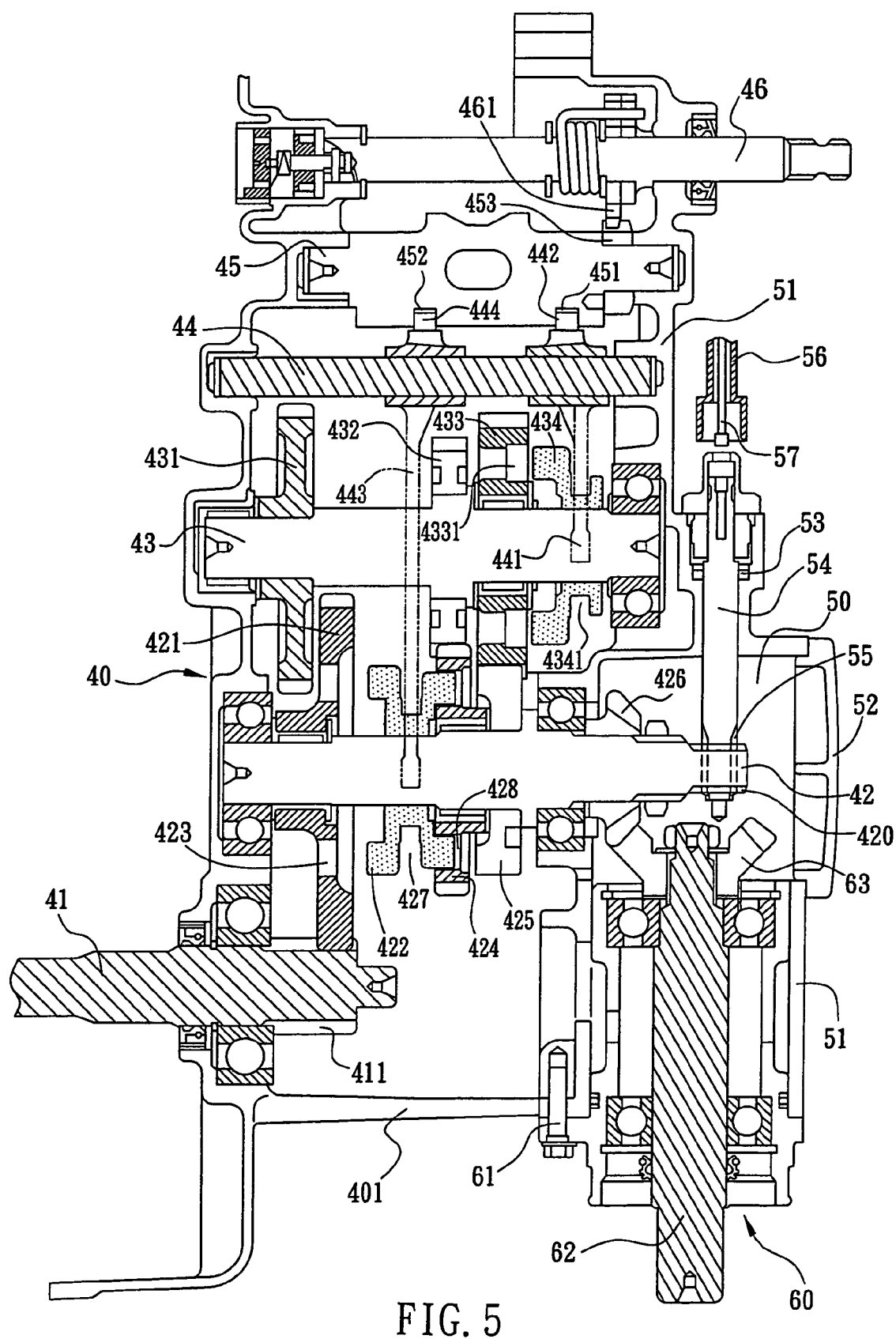
FIG. 5 is similar to FIG. 3 but showing the gearshift lever shifted to the low-range gearshift position.

Referring to FIG. 5, when operating the gearshift lever 46 to move the gearshift hub 45 to the forward gearshift low-range position, the second push rod 443 will move the second sliding block 422 into the coupling hole 428 of the low-range gear 424, for enabling the engine driving force to be transferred from the transmission gear 411 at the driven shaft 41 to the transmission gear 431 at the main shaft 43 to rotate the main shaft 43. At this time, the low-range gear 432 at the main shaft 43 will drive the low-range gear 424 to rotate the linking shaft 42, the drive bevel gear 426, the driven bevel gear 63 and the output shaft 62, and to further rotate the rear wheels of the motor vehicle for low-range (low speed) high-torque forward movement (not shown).

Therefore, by means of the operation of the transmission gear 431 at the main shaft 43, the low-range gear 432, the forward gear 433, the first sliding block 434, the back ward 421 at the linking shaft 42, the second sliding block 422, the low-range gear 424, the forward gear 425 and the drive bevel gear 426, the driven bevel gear 63 at the output shaft 62 can be controlled to mesh with the drive bevel gear 426 at the linking shaft 42. This arrangement eliminates the noise problem due to inaccurate engagement between gears as encountered in the prior art design. Further, the gearbox cover 51 provides a receiving chamber 50 for quick installation of the output shaft set 60 to eliminate the complicated installation procedure of the prior art design. Further, the design of the detachable lid 52 of the gearbox cover 51 enables the maintenance engineer to access to the drive bevel gear 426 at the linking shaft 42 easily. Further, the gearbox 40 provides a mounting hole 53 to accommodate the actuation rod 54, for enabling the cable 56 to drive the mileage counter to count the speed and mileage of the motor vehicle.

Although the present invention has been explained in relation to its preferred embodiment, it is to be understood that many other possible modifications and variations can be made without departing from the spirit and scope of the invention as hereinafter claimed.

What is claimed is:

1. A transmission gearbox for use in a motor vehicle comprising a box body covered with a gearbox cover to accommodate a driven shaft, a linking shaft, a main shaft, and an output shaft set for enabling engine driving force to be transferred from said driven shaft through said linking shaft and said main shaft to said output shaft set;

said linking shaft has mounted thereon a drive bevel gear; said gearbox cover defines therein a receiving chamber around said drive bevel gear and adapted to accommodate said output shaft set; said output shaft set comprises an output shaft and a driven bevel gear fixedly mounted on said output shaft and meshed with said drive bevel gear; and wherein said gearbox has a mounting hole disposed in communication with said receiving chamber and accommodating an actuation rod, said actuation rod having a first end, a worm fixedly mounted on said first end and meshed with a toothed portion at one end of said linking shaft.

2. The transmission gearbox as claimed in claim 1, wherein said gearbox cover is provided with a detachable lid.

3. The transmission gearbox as claimed in claim 1, wherein said output shaft set is affixed to said receiving chamber in said gearbox cover with a screw member.

* * * * *